US009551806B2

(12) United States Patent
Le et al.

(10) Patent No.: US 9,551,806 B2
(45) Date of Patent: Jan. 24, 2017

(54) DETERMINATION AND DISPLAY OF APPARENT RESISTIVITY OF DOWNHOLE TRANSIENT ELECTROMAGNETIC DATA

(71) Applicant: Baker Hughes Incorporated, Houston, TX (US)

(72) Inventors: Fei Le, Houston, TX (US); Gregory B. Itskovich, Houston, TX (US); Steven A. Morris, Spring, TX (US); Sushant M. Dutta, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 265 days.

(21) Appl. No.: 14/103,611

(22) Filed: Dec. 11, 2013

(65) Prior Publication Data

US 2015/0160367 A1 Jun. 11, 2015

(51) Int. Cl.
*G01V 3/28* (2006.01)
*E21B 49/00* (2006.01)

(52) U.S. Cl.
CPC .............. *G01V 3/28* (2013.01); *E21B 49/00* (2013.01)

(58) Field of Classification Search
CPC ...... E21B 43/247; E21B 43/30; E21B 47/122; E21B 47/011; E21B 47/01; E21B 49/00; G01V 11/002; G01V 3/30; G01V 3/28; G01V 3/12; G01V 2210/6163; G01V 5/04; G01R 33/12; G01R 33/123
See application file for complete search history.

(56) References Cited

U.S. PATENT DOCUMENTS 5,955,884 A * 9/1999 Payton ............... G01V 3/26
324/339
6,541,975 B2 4/2003 Strack
(Continued)

FOREIGN PATENT DOCUMENTS

WO 2006022921 A1 3/2006

OTHER PUBLICATIONS

Meju, Maxwell A., "A simple method of transient electromagnetic data analysis," Geophysics vol. 63, No. 2 pp. 405-410 (Apr. 1998).
(Continued)

*Primary Examiner* — Vinh Nguyen
(74) *Attorney, Agent, or Firm* — Mossman Kumar & Tyler PC

(57) ABSTRACT

Systems, devices, and methods for evaluating an earth formation. Methods may include inducing a current in the formation; measuring a time-dependent transient electromagnetic (TEM) signal induced by the formation responsive to the current; and estimating apparent resistivity values for each of a plurality of samples derived from the TEM measurement, wherein each sample corresponds to a discrete time window of the TEM measurement. Estimating the apparent resistivity values for each of the samples includes determining for each sample a simulated homogeneous formation that provides a best fit for the sample. The apparent resistivity values may be used to estimate distance to an interface. The apparent resistivity values or the estimated distance may be logged and the log displayed. The apparent resistivity values, the estimated distance, or the log may be used to conduct further operations in a borehole, including geosteering.

20 Claims, 15 Drawing Sheets

(56) References Cited

U.S. PATENT DOCUMENTS

| | | | |
|---|---|---|---|
| 7,414,406 B2 | 8/2008 | Banning et al. | |
| 8,278,931 B2 | 10/2012 | Fang et al. | |
| 2004/0257240 A1* | 12/2004 | Chen | G01V 3/38 340/853.1 |
| 2007/0256832 A1 | 11/2007 | Hagiwara et al. | |
| 2009/0243618 A1* | 10/2009 | Wang | G01V 3/28 324/338 |
| 2010/0125439 A1 | 5/2010 | Reiderman et al. | |
| 2011/0012602 A1* | 1/2011 | Reiderman | E21B 47/102 324/339 |
| 2011/0257886 A1 | 10/2011 | Itskovich et al. | |
| 2012/0192640 A1 | 8/2012 | Minh et al. | |
| 2012/0209528 A1* | 8/2012 | Itskovich | G01V 3/28 702/7 |
| 2013/0144529 A1 | 6/2013 | Seydoux et al. | |

OTHER PUBLICATIONS

Bell, C. et al., "Navigating and Imaging in Complex Geology With Azimuthal Propagation Resistivity While Drilling," SPE102637, (Sep. 2006).

Chemali, R., et al., "Improved Geosteering by Integrating in Real Time Images From Multiple Depths of Investigation and Inversion of Azimuthal Resistivity Signals," SPE 132439 (Apr. 2010).

Tilsley-Baker, R., et al., "Extra Deep Resistivity Experience in Brazil Geosteering Operations," SPE166309 (Oct. 2013).

Int'l Search Report and Written Opinion in PCT/US2014/068590, mailed Apr. 14, 2015.

\* cited by examiner 2-layer Model (More Conductive and Higher Contrast). Tool Relative Dip: 85°.

DETERMINATION AND DISPLAY OF APPARENT RESISTIVITY OF DOWNHOLE TRANSIENT ELECTROMAGNETIC DATA

FIELD OF THE DISCLOSURE

In one aspect, the present disclosure generally relates methods, systems, and devices for earth formation evaluation including determining properties of the earth formation. More specifically, the present disclosure relates to measurements using transient electromagnetic signals.

BACKGROUND OF THE DISCLOSURE

Geologic formations are used for many purposes such as hydrocarbon and water production. Boreholes are typically drilled into the earth in order to intersect and access the formations.

Electromagnetic induction resistivity instruments can be used to determine the electrical conductivity of earth formations surrounding a wellbore. In transient electromagnetic (TEM) methods, voltage or current pulses that are excited in a transmitter initiate the propagation of an electromagnetic signal in the earth formation. The transmitter and receiver may be at the surface or within the wellbore. Electric currents diffuse outwards from the proximity of the transmitter into the surrounding formation. At different times, information arrives at the measurement sensor predominantly from different investigation depths. Generally, early-time signals predominantly relate to near-zone responses (lesser depths of investigation) and late-time signals predominantly relate to remote-zone responses (greater depths of investigation).

SUMMARY OF THE DISCLOSURE

Aspects of the present disclosure generally relate to methods, systems, and devices for evaluating an earth formation using transient electromagnetic (TEM) signals. Methods may include (a) inducing a current in the formation; (b) measuring a time-dependent transient electromagnetic (TEM) signal induced by the formation responsive to the current; and (c) estimating apparent resistivity values for each of a plurality of samples derived from the TEM measurement. Each sample may correspond to a discrete time window of the TEM measurement. Estimating the apparent resistivity values for each of the plurality of samples may include determining for each sample a simulated homogeneous formation that provides a best fit for the sample. A tool may be used to perform at least steps (a) and (b). Methods may include determining the simulated homogeneous formation that provides the best fit for the sample by identifying, from a plurality of simulated homogeneous formations, the simulated homogeneous formation having synthetic responses that provide the best fit for the sample. The synthetic responses may be determined using the respective simulated homogeneous formation and known parameters for the tool. The method may include storing the synthetic responses for each of a plurality of simulated homogeneous formations. The synthetic responses may be pre-calculated using the respective simulated homogeneous formation and known parameters for the tool. Methods may include determining in near real-time synthetic responses for each of a plurality of simulated homogeneous formations using the respective simulated homogeneous formation and known parameters for the tool. The known parameters for the tool may include at least one of: i) a transmitter moment; ii) a receiver moment; and iii) tool dimensions. The method may include using a least squares minimization technique. Inducing a current in the formation further may include changing a magnetic moment of a transmitter in the borehole.

Some embodiments may include repeating steps (a)-(c) to estimate corresponding apparent resistivity values estimated from TEM measurements for a plurality of borehole depths, and may also include generating a log of the corresponding apparent resistivity values as a function of borehole depth. Method may include displaying the apparent resistivity log.

Embodiments may include using the corresponding apparent resistivity values to estimate a corresponding distance to an interface for the plurality of borehole depths; and generating a log of the distance to the interface as a function of depth. Using the corresponding apparent resistivity values to estimate the corresponding distance to the interface may include identifying from the apparent resistivity values a simulated homogeneous formation that provides a best fit for the sample; estimating a diffusion time corresponding to apparent resistivity curve separation; and calculating a diffusion distance corresponding to the diffusion time in the simulated homogeneous formation.

Methods may include estimating apparent resistivity values for each of the plurality of samples derived from the TEM measurement while conducting drilling operations in the borehole. Methods may include repeating steps (a)-(c) to estimate corresponding apparent resistivity values estimated from TEM measurements at a plurality of different stages in a hydrocarbon recovery operation. Methods may include generating a log of the corresponding apparent resistivity values as a function of stage of the hydrocarbon recovery operation. Methods may include displaying the apparent resistivity log and/or using the corresponding apparent resistivity values to estimate a corresponding distance to fluid fronts for the plurality of stages and generating a log of the distance to fluid fronts as a function of stage of the hydrocarbon recovery operation.

Embodiments according to the present disclosure may include an apparatus for evaluating an earth formation. The apparatus may be configured to evaluate the earth formation in near real-time. The apparatus may include: a carrier configured to be conveyed in a borehole; a transmitter disposed on the carrier and configured to induce a current in the formation; at least one receiver disposed on the carrier and configured to provide a time-dependent transient electromagnetic (TEM) signal induced by the formation responsive to the current; and at least one processor. The processor may be configured to measure the signal; and estimate apparent resistivity values for each of a plurality of samples derived from the measurement, wherein each sample corresponds to a discrete time window of the measurement. The apparatus may include a non-transitory computer-readable medium; and a program stored by the non-transitory computer-readable medium comprising instructions that, when executed, cause the processor to perform a method as described herein.

Embodiments of the present disclosure may include a non-transitory computer readable medium product for evaluating an earth formation intersected by a borehole, the computer readable medium product having instructions disposed thereon that, when executed by the at least one processor, cause the at least one processor to: estimate apparent resistivity values for each of a plurality of samples derived from a measurement of a time-dependent transient electromagnetic (TEM) signal in a borehole, the signal induced by the formation responsive to a TEM current in the formation, wherein each sample corresponds to a discrete time window of the TEM measurement.

Example features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1:
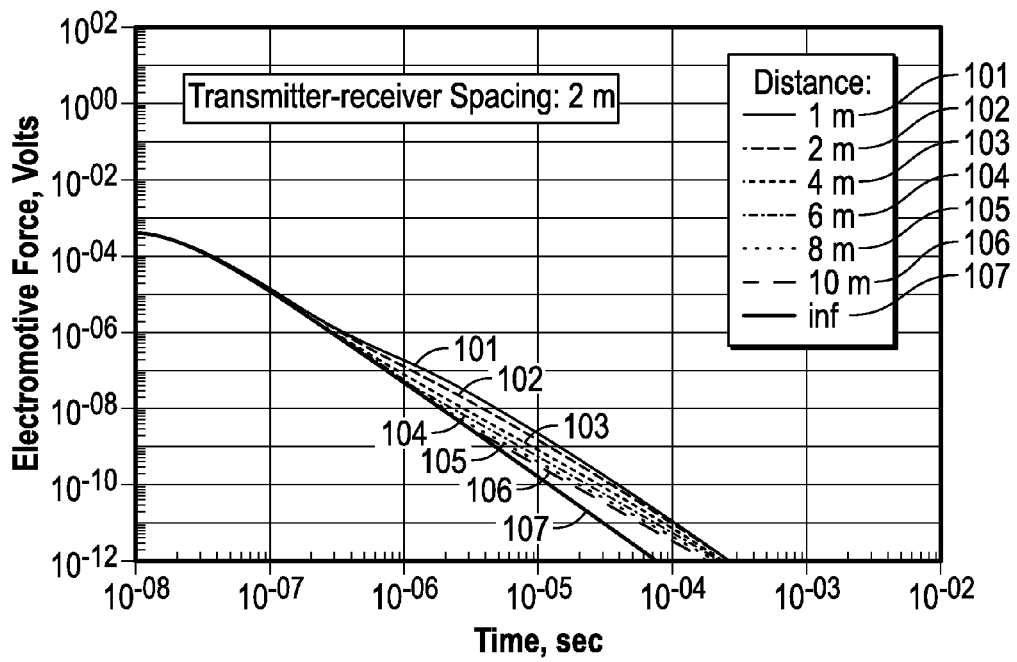
FIG. 1 shows a typical TEM response of a coaxial (ZZ) tool in accordance with embodiments of the present disclosure.

Aspects of the present disclosure relate to apparatuses and methods for electromagnetic induction well logging for evaluating an earth formation. More specifically, the present disclosure relates to estimating and displaying properties of the formation relating to transient electromagnetic (TEM) measurements. The formation may be intersected by a wellbore and the TEM measurements may be taken in the wellbore. The TEM measurements may be used to estimate a parameter of interest. Aspects of the present disclosure facilitate the display and analysis of TEM measurements. Further aspects may include methods for conducting a drilling operation.

The present disclosure is susceptible to embodiments of different forms. There are shown in the drawings, and herein will be described in detail, specific embodiments of the present disclosure with the understanding that the present disclosure is to be considered an exemplification of the principles of the present disclosure and is not intended to limit the present disclosure to that illustrated and described herein.

Transient electromagnetic (TEM) tools are configured to effect changes in a transmitter to induce a time-dependent current in a formation. Transient signals occur in the receiver antennas, which are induced by the eddy currents in the formation. The induced signal contains information about formation characteristics. Thus, the receiver produces a response indicative of formation characteristics, such as, for example, a parameter of interest. Electronics may be configured to measure the time-dependent transient electromagnetic (TEM) signal induced by the eddy currents in the formation.

FIG. 1 shows a typical TEM response of a coaxial (ZZ) tool in accordance with embodiments of the present disclosure. In this example, the transmitter-receiver spacing is 2 meters in a two-layer model, and the resistivity values of the first and second layer are 50 Ω-m and 2 Ω-m, respectively, as described below with respect to FIG. 4A. The distance between the tool axis and the boundary varies between 1 meter and infinite. The tool is located in the first layer with its axis parallel to the boundary. Unless otherwise noted, the drawings herein are not to scale.

Responses are measured (in Volts) as the ordinate and the time is shown (in seconds) as the abscissa. Responses at distances of 1, 2, 4, 6, 8, and 10 meters are shown as 101, 102, 103, 104, 105, and 106, respectively. The response for infinite separation distance is shown as 107.

It is evident that the TEM signals by themselves are not intuitive to interpret, as all curves look similar to each other except for variations in decay rates as time progresses. Thus, interpretation of the signals is problematic.

Previous attempts to characterize the formation using TEM signals have included further processing. For traditional frequency-domain measurements, it is common practice to convert raw measurements (receiver voltages, or attenuation/phase difference among receivers) to apparent resistivity (AR) or apparent conductivity (AC) for log display and analysis purposes. AR (or AC) is defined as the resistivity (or conductivity) of a homogeneous formation, in which the tool responses match the measured responses.

More recently, formation characterization using TEM signals has included techniques involving application of a similar concept to TEM measurements. For a coaxial (ZZ) tool with transmitter-receiver spacing L in homogeneous formation of conductivity σ, the induced voltage is given by:

$$V_{zz}(t) = C \frac{(\mu_0 \sigma)^{3/2}}{8 t^{5/2}} e^{-u^2},$$

where $$u^2 = \frac{\mu_0 \sigma}{4} \frac{L^2}{t},$$

C is a constant, and $\mu_0$ is the permeability of free space.

Therefore, the apparent conductivity (AC) of the voltage response for this tool at each time can be determined through:

$$C \frac{(\mu_0 \sigma_{app}(t))^{3/2}}{8 t^{5/2}} e^{-u_{app}^2} = V_{zz}(t), \text{ where } u_{app}^2 = \frac{\mu_0 \sigma_{app}(t)}{4} \frac{L^2}{t}.$$

Similarly for a coplanar (XX) tool, the induced voltage is:

$$V_{xx}(t) = C \frac{(\mu_0 \sigma)^{3/2}}{8 t^{5/2}} (1 - u^2) e^{-u^2},$$

where $$u^2 = \frac{\mu_0 \sigma}{4} \frac{L^2}{t},$$

C is a constant, and the AC is determined through:

$$C \frac{(\mu_0 \sigma_{app}(t))^{3/2}}{8 t^{5/2}} (1 - u_{app}(t)^2) e^{-u_{app}^2} = V_{zz}(t),$$

$$\text{where } u_{app}(t)^2 = \frac{\mu_0 \sigma_{app}(t)}{4} \frac{L^2}{t}$$

The apparent resistivity (AR) can straightforwardly be determined through the relation AR=1/AC. Also, note that AR and AC only have meanings for main-component measurements (XX, YY, ZZ) since responses for cross-component measurements (XY, XZ, YX, YZ, ZX, ZY) in a homogeneous formation are zero.

Figure 2:
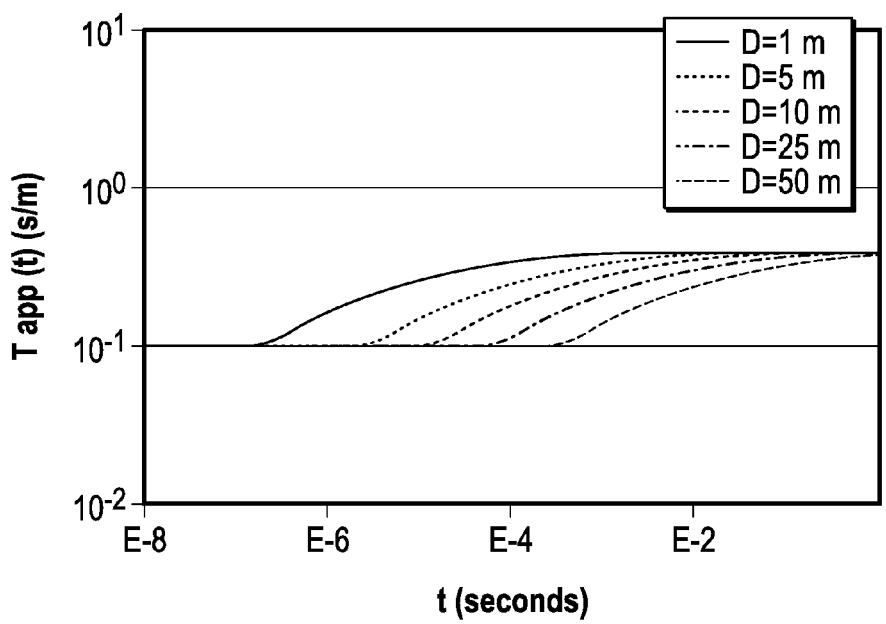
FIG. 2 illustrates a graphic representation of the time-varying AC of a coaxial tool in a two-layer formation environment for a variety of distance-to-bed values.

FIG. 2 illustrates a graphic representation of the time-varying AC of a coaxial tool in a two-layer formation environment for a variety of distance-to-bed values. The tool has 1-meter spacing in a 2-layer formation environment for a variety of distance-to-bed values (D). As illustrated here, in previous methodologies, AC has been generated as a function of time. In graphic depiction, at each logging depth a set of time-dependent AC/AR curves may be generated. It is difficult to display AC and/or AR, with such format and notation, on a traditional log track and compare side-to-side with other frequency-domain measurements.

Figure 3A:
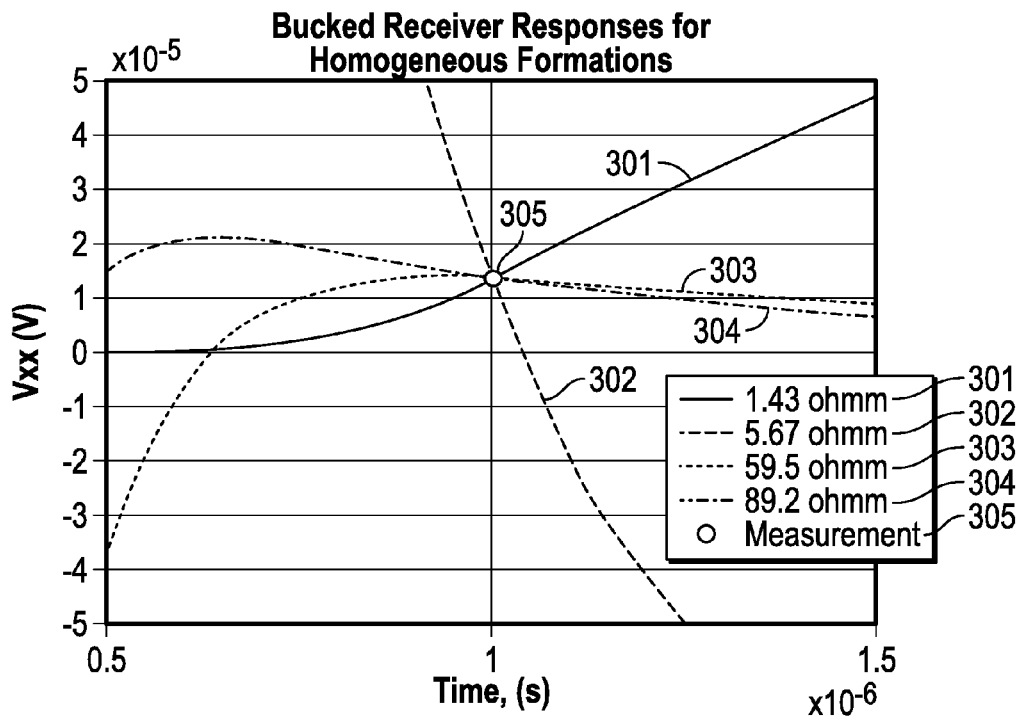
FIG. 3A is an illustration of bucked receiver responses of a coplanar (XX) tool in various homogeneous formations for a time range of 0.5 to 1.5 microseconds.

Referring to FIG. 3A, the AR values at each logging depth are determined by matching measured voltage at a particular time sample with homogeneous formation responses of the same time sample. According to the traditional method, if more than one AR value is found at a particular time sample, the algorithm selects the AR value that is closest to the AR of an adjacent time sample of the same logging depth. As is readily apparent, previous techniques also suffer from the problem of possible non-unique results. That is, more than one AR (and/or AC) value can match a measurement at a particular time.

FIG. 3A is an illustration of bucked receiver responses of a coplanar (XX) tool in various homogeneous formations for a time range of 0.5 to 1.5 microseconds. In measurement-while-drilling ('MWD'), for example, bucking is used to compensate for the signal from conductive drill pipe. The tool has one transmitter and two receivers with transmitter-receiver spacing of 20 ft and 30 ft respectively. Referring to FIG. 3A, the bucked voltage is determined through:

$$V_{bucked}(t) = V_{30\_fi}(t) - \left(\frac{20}{30}\right)^3 V_{20\_fi}(t).$$

FIG. 3A illustrates response for four homogeneous formations 301-304 having resistivity values of 1.43 ohm-m, 5.67 ohm-m, 59.5 ohm-m, and 89.2 ohm-m, respectively. It is evident from FIG. 3A that, for a given time sample, multiple formation resistivity values could lead to a same voltage reading. Each formation produces a different corresponding TEM signal 301-304, but the voltages for the four signals all measure 14.1 µV at t=1 µs. Thus, the 1 µs measurement 305 may have as many as four potential AR values, and if the 1 µs measurement 305 (which happens to be at 14.1 µV) is used in calculating AR, there will then be four equivalent AR values to select from. Such equivalence in AR determination is hard to avoid when a large range of formation resistivity values is considered. This equivalence could lead to potential errors in log presentation and interpretation.

Figure 4A:
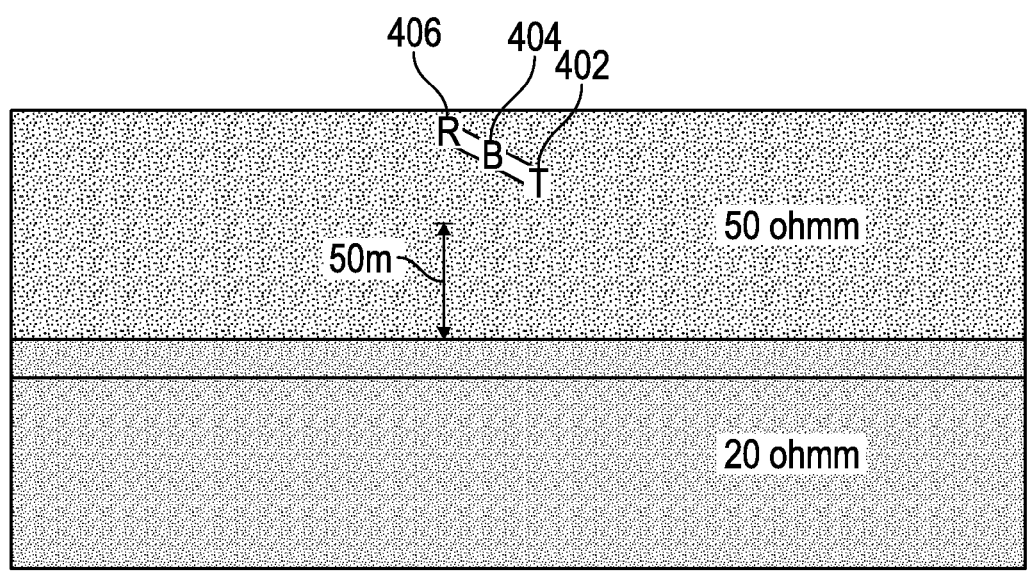
FIG. 4A illustrates an example tool configuration with respect to an earth formation in accordance with embodiments of the present disclosure.
Figure 4B:
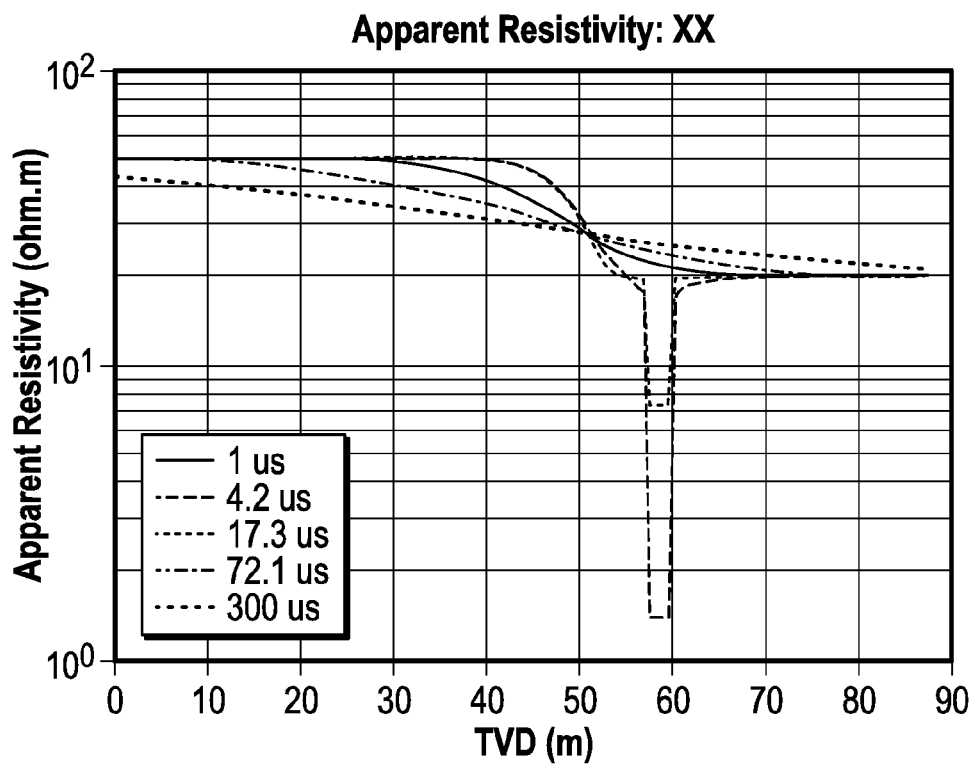
FIG. 4B illustrates an apparent resistivity log for the XX component displayed in accordance with embodiments of the present disclosure.
Figure 4C:
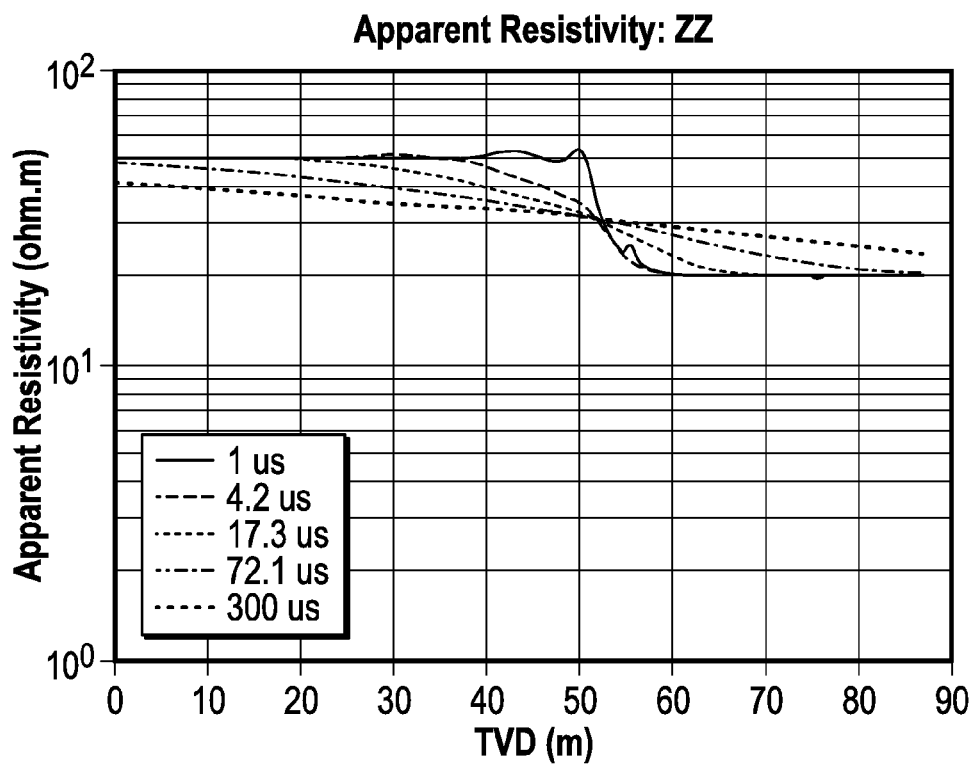
FIG. 4C illustrates an apparent resistivity log for the ZZ component displayed in accordance with embodiments of the present disclosure.

FIGS. 4A-4C illustrate the effect of non-uniqueness on AR logs generated for a three-coil tool logging through a 2-layer environment. FIG. 4A illustrates an example tool configuration with respect to an earth formation in accordance with embodiments of the present disclosure. FIG. 4B illustrates an apparent resistivity log for the XX component displayed in accordance with embodiments of the present disclosure. FIG. 4C illustrates an apparent resistivity log for the ZZ component displayed in accordance with embodiments of the present disclosure. Note that the AR logs are presented in the new format taught by the present disclosure, but that apparent resistivity is calculated according to well known methods.

The earth model has an upper layer with resistivity of 50 ohm-m and a bottom layer with resistivity of 20 ohm-m. The tool has one transmitter 402, one bucking coil 404 (located 20 feet behind the transmitter) and a receiver coil 406 (30 feet behind the transmitter). The dip angle is 85 degrees. FIGS. 4B and 4C are the coplanar (XX) and coaxial (ZZ) AR logs at the same five time samples as used in FIGS. 2 & 3. As FIG. 4B shows, within the true vertical depth (TVD) interval of 57-60 meters the algorithm obviously fails to select correct AR values for the shallowest/earliest two curves due to equivalence. It is difficult to generalize selection among equivalent AR values to a wide range of formation properties.

Aspects of the present disclosure include methods for processing a TEM measurement for evaluation of the formation. Each measurement may be taken at a particular logging depth (e.g., borehole depth). Aspects of the present disclosure may reduce non-uniqueness while increasing robustness of the AR calculation. Embodiments may also decrease consumed bandwidth by performing downhole processing of TEM measurements into AR and sending uphole only the AR measurements, which may reduce bandwidth for the main component TEM signals by a factor of 10.

General method embodiments may include estimating apparent resistivity values for each of a plurality of samples derived from the TEM measurement, wherein each sample corresponds to a discrete time window of the TEM measurement. The samples may be mutually exclusive or may overlap in time. Some embodiments may include generating the plurality of samples by dividing the TEM measurement into a plurality of corresponding time intervals (windows). The time intervals may be of an identical duration, or may be of different durations.

In one example, for a TEM measurement with N values, the measurement is divided into n time windows corresponding roughly to n depths of investigation, so that each sample consists of N/n data points. For each sample, the Residual between the n measurements and homogeneous formation responses of the same time window is calculated for a range of resistivity R. For a given time window m (1≤m≤n), the residual is defined as:

$$Residual_m(R) = \sum_{i=(m-1)N/n+1}^{mN/n} \left( \frac{V_{meas}(t_i) - V_{homo}(R, t_i)}{|V_{homo}(R, t_i)| + \varepsilon} \right)^2$$

where $V_{meas}(t_i)$ is the measured voltage at time $t_i$; $V_{homo}(R, t_i)$ is the voltage response in a homogeneous formation with resistivity R at time $t_i$; and ε is a small positive number to prevent numerical instability. AR is estimated by finding the value R that minimizes $Residual_m$.

After AR is estimated for each sample, n AR values are associated with a corresponding one of each of the n time windows. Corresponding n AR values may then be estimated at each logging depth, and n AR curves may be generated corresponding to the n time windows.

Embodiments of the present disclosure include methods, devices, and systems for estimating a parameter of interest using a transient electromagnetic (TEM) measurement tool in a borehole intersecting an earth formation. Methods may include inducing a time-dependent current in the formation; measuring a time-dependent transient electromagnetic (TEM) signal induced by the formation responsive to the current; and estimating apparent resistivity values for each of a plurality of samples derived from the TEM measurement, wherein each sample corresponds to a discrete time window of the TEM measurement. Estimating the apparent resistivity values for each of the plurality of samples may include determining for each sample a simulated homogeneous formation that provides a best fit for the sample. Measurement, as described herein, refers to information indicative of a parameter of interest relating to the formation. The term "information" as used herein includes any form of information (analog, digital, EM, printed, etc.), and may include one or more of: raw data, processed data, and signals. Example parameters of interest may include apparent resistivity, apparent conductivity, distance to bed, distance to fluid front, and so on. This information may be obtained in near real-time.

Methods disclosed herein may also include using the parameter of interest in performing further operations in the borehole (e.g., drilling, reaming, production, etc.). Embodiments of the disclosure include estimating and applying the parameter of interest in near real-time.

Figure 3B:
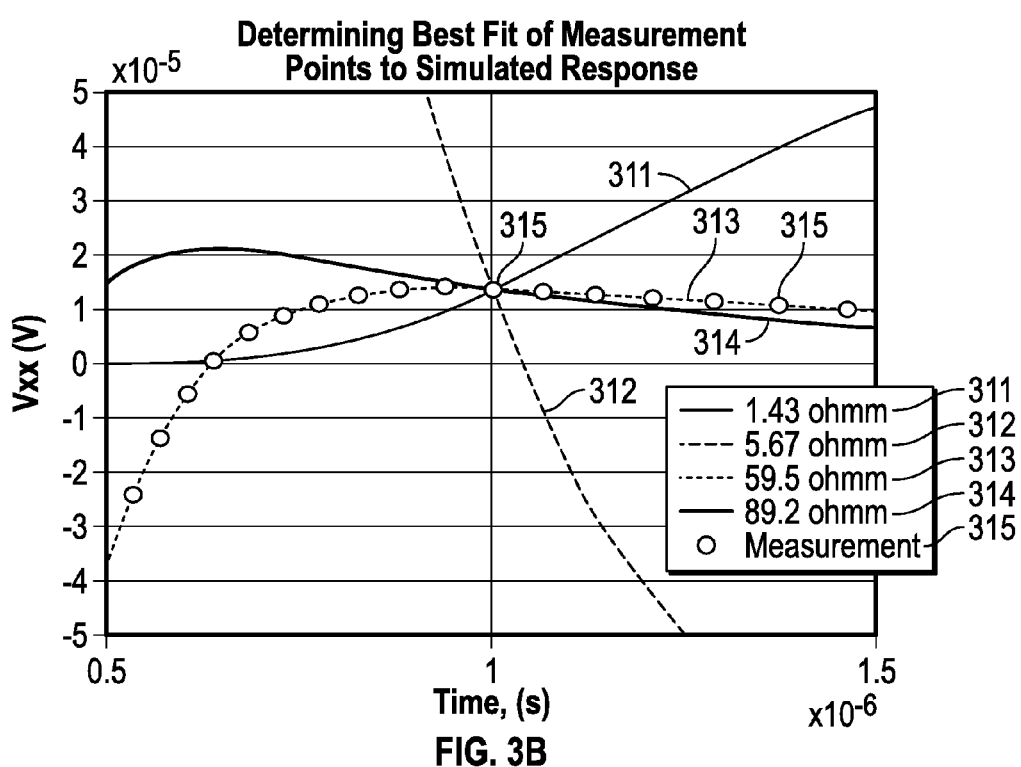
FIG. 3B illustrates techniques in accordance with embodiments of the present disclosure.

FIG. 3B illustrates how non-uniqueness in AR determination may be reduced in accordance with embodiments of the present disclosure. FIG. 3B shows the bucked responses, as in FIG. 3A above, for a time window from 0.5 to 1.5 microseconds. The synthetic responses 311-315 from four simulated homogeneous formations having resistivity values of 1.43, 5.67, 59.5, and 89.2 ohm-m, respectively, are compared with a series of measurements. There are 17 measurement points 315 within the time window. In contrast with FIG. 3A, instead of selecting among four equivalent AR values using only the 1 μs measurement, the present disclosure utilizes each measurement point in the window, and fits the data to one of various homogeneous formation responses. For this particular example, it is straightforward to determine that the correct AR should be 59.5 ohm-m, because the Residual for synthetic response 313 (based on the above algorithm) is zero. The synthetic responses for the other three formation models (311, 312, 314), even though matching the measurement equally well at 1 μs, are not selected as the best fit because their residuals for the entire time window are much bigger. Through this curve-fitting scheme, non-uniqueness among the four AR values is removed, and the correct result is estimated.

Figure 5:
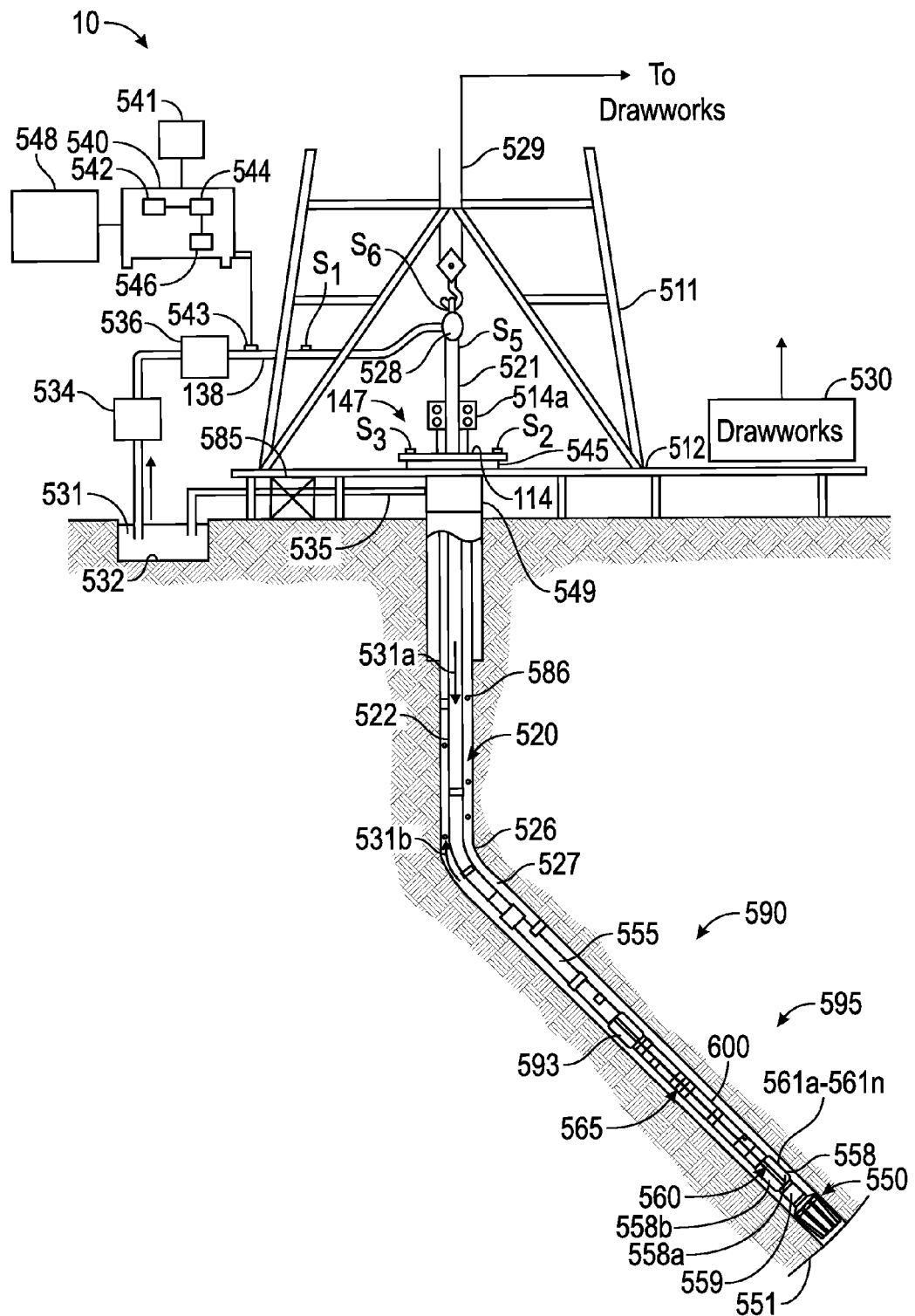
FIG. 5 is a schematic diagram of an exemplary drilling system according to one embodiment of the disclosure.

FIG. 5 is a schematic diagram of an exemplary drilling system 10 according to one embodiment of the disclosure. FIG. 5 shows a drill string 520 that includes a bottomhole assembly (BHA) 590 conveyed in a borehole 526. The drilling system 10 includes a conventional derrick 511 erected on a platform or floor 512 which supports a rotary table 514 that is rotated by a prime mover, such as an electric motor (not shown), at a desired rotational speed. A tubing (such as jointed drill pipe 522), having the drilling assembly 590, attached at its bottom end extends from the surface to the bottom 551 of the borehole 526. A drill bit 550, attached to drilling assembly 590, disintegrates the geological formations when it is rotated to drill the borehole 526. The drill string 520 is coupled to a drawworks 530 via a Kelly joint 521, swivel 528 and line 529 through a pulley. Drawworks 530 is operated to control the weight on bit ("WOB"). The drill string 520 may be rotated by a top drive (not shown) instead of by the prime mover and the rotary table 514. Alternatively, a coiled-tubing may be used as the tubing 522. A tubing injector 514a may be used to convey the coiled-tubing having the drilling assembly attached to its bottom end. The operations of the drawworks 530 and the tubing injector 514a are known in the art and are thus not described in detail herein.

A suitable drilling fluid 531 (also referred to as the "mud") from a source 532 thereof, such as a mud pit, is circulated under pressure through the drill string 520 by a mud pump 534. The drilling fluid 531 passes from the mud pump 534 into the drill string 520 via a desurger 536 and the fluid line 538. The drilling fluid 531a from the drilling tubular discharges at the borehole bottom 551 through openings in the drill bit 550. The returning drilling fluid 531b circulates uphole through the annular space 527 between the drill string 520 and the borehole 526 and returns to the mud pit 532 via a return line 535 and drill cutting screen 585 that removes the drill cuttings 586 from the returning drilling fluid 531b. A sensor S1 in line 538 provides information about the fluid flow rate. A surface torque sensor S2 and a sensor S3 associated with the drill string 520 respectively provide information about the torque and the rotational speed of the drill string 520. Tubing injection speed is determined from the sensor S5, while the sensor S6 provides the hook load of the drill string 520.

Well control system 547 is placed at the top end of the borehole 526. The well control system 547 includes a surface blow-out-preventer (BOP) stack 515 and a surface choke 549 in communication with a wellbore annulus 527.

The surface choke 549 can control the flow of fluid out of the borehole 526 to provide a back pressure as needed to control the well.

In some applications, the drill bit 550 is rotated by only rotating the drill pipe 522. However, in many other applications, a downhole motor 555 (mud motor) disposed in the BHA 590 also rotates the drill bit 550. The rate of penetration (ROP) for a given BHA largely depends on the WOB or the thrust force on the drill bit 550 and its rotational speed.

A surface control unit or controller 540 receives signals from the downhole sensors and devices via a sensor 543 placed in the fluid line 538 and signals from sensors S1-S6 and other sensors used in the system 10 and processes such signals according to programmed instructions provided to the surface control unit 540. The surface control unit 540 displays desired drilling parameters and other information on a display/monitor 541 that is utilized by an operator to control the drilling operations. The surface control unit 540 may be a computer-based unit that may include a processor 542 (such as a microprocessor), a storage device 544, such as a solid-state memory, tape or hard disc, and one or more computer programs 546 in the storage device 544 that are accessible to the processor 542 for executing instructions contained in such programs. The surface control unit 540 may further communicate with a remote control unit 548. The surface control unit 540 may process data relating to the drilling operations, data from the sensors and devices on the surface, and data received from downhole; and may control one or more operations of the downhole and surface devices. The data may be transmitted in analog or digital form.

The BHA 590 may include a tool 500 configured for performing transient electromagnetic (TEM) measurements. The BHA 590 may also contain other formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the formation 595 surrounding the BHA 590. For convenience, all such sensors are generally denoted herein by numeral 565. The BHA 590 may further include a variety of other sensors and devices 559 for determining one or more properties of the BHA 590, such as vibration, bending moment, acceleration, oscillations, whirl, stick-slip, weight-on-bit, fluid flow rate, pressure, temperature, rate of penetration, azimuth, tool face, drill bit rotation, etc.

The BHA 590 may include a steering apparatus or tool 558 for steering the drill bit 550 along a desired drilling path. In one aspect, the steering apparatus may include a steering unit 560, having a number of force application members 561a-561n. The force application members may be mounted directly on the drill string, or they may be at least partially integrated into the drilling motor. In another aspect, the force application members may be mounted on a sleeve, which is rotatable about the center axis of the drill string. The force application members may be activated using electro-mechanical, electro-hydraulic or mud-hydraulic actuators. In yet another embodiment the steering apparatus may include a steering unit 558 having a bent sub and a first steering device 558a to orient the bent sub in the wellbore and the second steering device 558b to maintain the bent sub along a selected drilling direction. The steering unit 558, 560 may include near-bit inclinometers and magnetometers.

The drilling system 10 may include sensors, circuitry and processing software and algorithms for providing information about desired drilling parameters relating to the BHA, drill string, the drill bit and downhole equipment such as a drilling motor, steering unit, thrusters, etc. Many current drilling systems, especially for drilling highly deviated and horizontal wellbores, utilize coiled-tubing for conveying the drilling assembly downhole. In such applications a thruster may be deployed in the drill string 520 to provide the required force on the drill bit.

Exemplary sensors for determining drilling parameters include, but are not limited to drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, strain, stress, bending moment, bit bounce, axial thrust, friction, backward rotation, BHA buckling, and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT, a downhole measurement system, manufactured by BAKER HUGHES INCORPORATED.

The drilling system 10 can include one or more downhole processors at a suitable location such as 593 on the BHA 590. The processor(s) can be a microprocessor that uses a computer program implemented on a suitable non-transitory computer-readable medium that enables the processor to perform the control and processing. The non-transitory computer-readable medium may include one or more ROMs, EPROMs, EAROMs, EEPROMs, Flash Memories, RAMs, Hard Drives and/or Optical disks. Other equipment such as power and data buses, power supplies, and the like will be apparent to one skilled in the art. In one embodiment, the MWD system utilizes mud pulse telemetry to communicate data from a downhole location to the surface while drilling operations take place. The surface processor 542 can process the surface measured data, along with the data transmitted from the downhole processor, to evaluate the formation. While a drill string 520 is shown as a conveyance device for tool 500, it should be understood that embodiments of the present disclosure may be used in connection with tools conveyed via rigid (e.g. jointed tubular or coiled tubing) as well as non-rigid (e.g. wireline, slickline, e-line, etc.) conveyance systems. The drilling system 10 may include a bottomhole assembly and/or sensors and equipment for implementation of embodiments of the present disclosure on either a drill string or a wireline.

A point of novelty of the system illustrated in FIG. 5 is that the surface processor 542 and/or the downhole processor 593 are configured to perform certain methods (discussed below) that are not in the prior art. Surface processor 542 or downhole processor 593 may be configured to control steering apparatus 558, mud pump 534, drawworks 530, rotary table 514, downhole motor 555, other components of the BHA 590, or other components of the drilling system 10. Surface processor 542 or downhole processor 593 may be configured to control sensors described above and to estimate a parameter of interest according to methods described herein.

Control of these components may be carried out using one or more models using methods described below. For example, surface processor 542 or downhole processor 593 may be configured to modify drilling operations i) autonomously upon triggering conditions, ii) in response to operator commands, or iii) combinations of these. Such modifications may include changing drilling parameters, steering the drillbit (e.g., geosteering), and so on. Control of these devices, and of the various processes of the drilling system generally, may be carried out in a completely automated fashion or through interaction with personnel via notifications, graphical representations, user interfaces and the like. Reference information accessible to the processor may also be used. In some general embodiments, surface processor 542, downhole processor 593, or other processors (e.g. remote processors) may be configured to operate the TEM tool 500 to induce and measure TEM signals.

Figure 6:
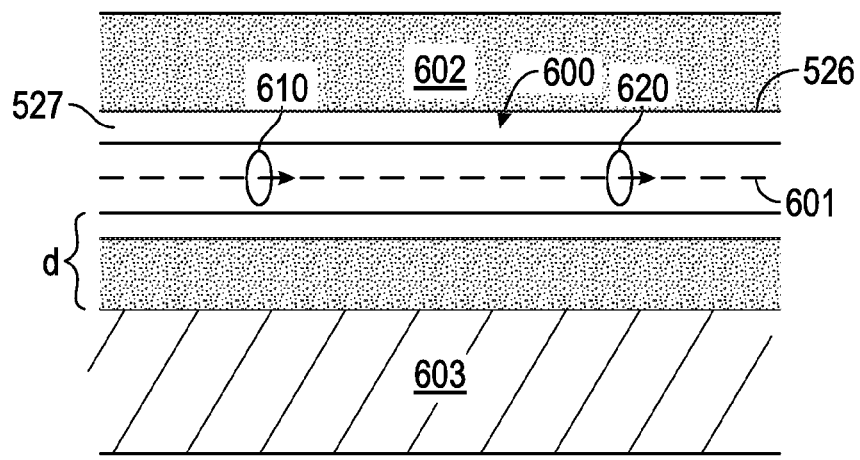
FIG. 6 illustrates a TEM tool in a subterranean environment in accordance with embodiments of the present disclosure.

FIG. 6 illustrates a TEM tool 600 in a subterranean environment in accordance with embodiments of the present disclosure. The tool 600 may include a transmitter 610 and a receiver 620 disposed along drillstring 120. Other embodiments may include additional transmitters or receivers. The transmitter 610 may be configured to induce a time-dependent current in the formation. For example, the transmitter 610 may include an antenna coil coupled with a current source. The receiver 620 may be configured to convert a time-dependent transient electromagnetic signal induced by the formation responsive to the current into an output signal. The tool 600 may be configured to cause the transient electromagnetic signal by abruptly changing a magnetic moment of the transmitter 610. This may be carried out by switching a current on and off in the transmitter coil to generate pulses. The transmitter 610 may include an antenna coil coupled with a current source and a magnetic core having residual magnetization. Switching current in the antenna coil results in magnetization reversal in the magnetic core and change in magnetic dipole moment of the antenna. Some embodiments may include an induction antenna for both transmitting and receiving signals and/or one or more bucking coils or other bucking components.

Many variations in transmitter and receiver configurations may be successfully employed. Transmitters and receivers may vary in number, location (e.g., with respect to the tool, to one another, to the drill bit, and so on) and orientation (e.g., transverse, longitudinal, tilted, etc.). As one example, the techniques of the present disclosure are amenable for use with the 3DEX® tool, such as, for example, in connection with anisotropic formation media.

In operation, tool 600 is configured to effect changes in the transmitter to induce a time-dependent current in the formation. Transient signals occur in the receiver antennas that are induced by the formation responsive to the current. The induced signal contains information about formation characteristics. Thus, the receiver produces a response indicative of formation characteristics, such as the parameter of interest. A processor is configured to measure the time-dependent transient electromagnetic (TEM) signal induced by the formation.

TEM tool 600 lies next to a formation interface 605. Transmitter 610 and receiver 620 lie along a common axis 601 that is horizontally positioned in the upper half-space 602 parallel to the interface and is separated by a distance d from the interface. The term "interface" includes a fluid interface between two different fluids in an earth formation (e.g., a fluid front) as well as a boundary between two different geologic or stratigraphic intervals in the earth (e.g., distance to bed). Examples following use distance to bed for convenience of illustration, but it should be readily apparent that embodiments wherein distance to an interface of a different type is estimated are within the scope of the disclosure. The upper half-space 602 has a resistivity of 50 Ω-m and the remote formation (lower half-space) 603 is shown to have a resistivity of 2 Ω-m. It should be noted that the coaxial transmitter-receiver configuration shown herein is not to be construed as a limitation and any suitable arrangement including but not limited to an arrangement having a transverse transmitter and/or a transverse receiver may be used.

Figure 7A:
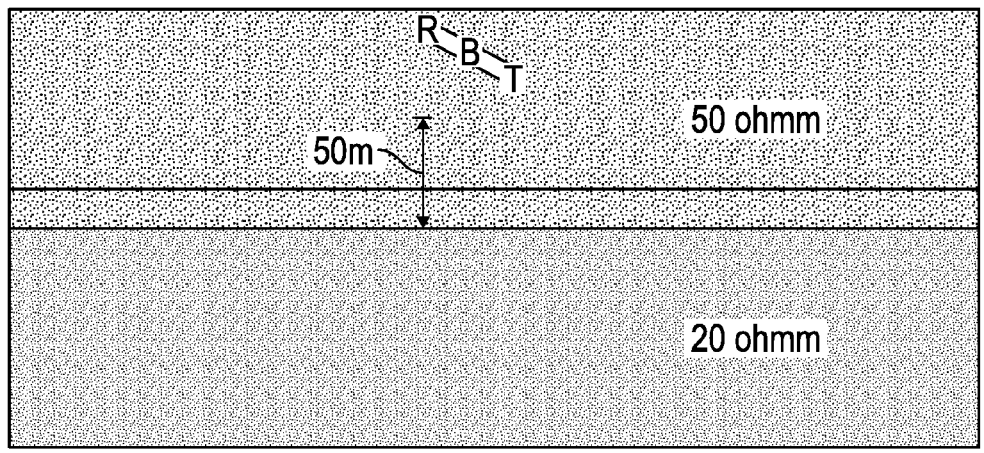
FIG. 7A illustrates an example tool configuration with respect to an earth formation in accordance with embodiments of the present disclosure.
Figure 7B:
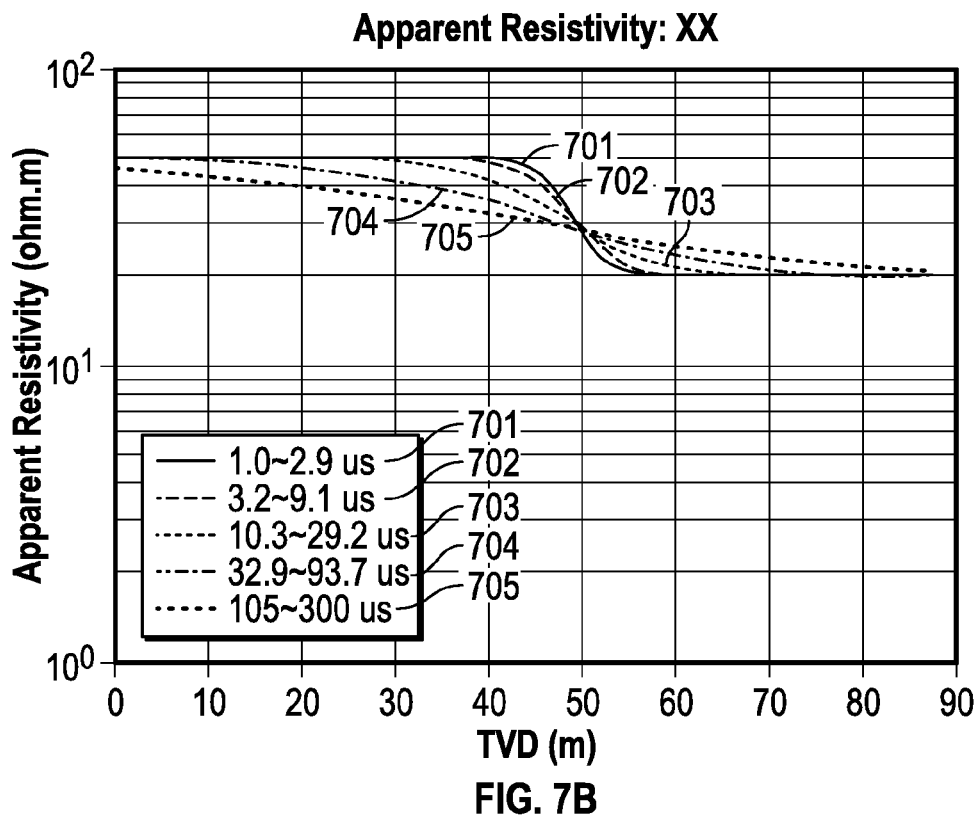
FIG. 7B illustrates an apparent resistivity log for the XX component in accordance with embodiments of the present disclosure.
Figure 7C:
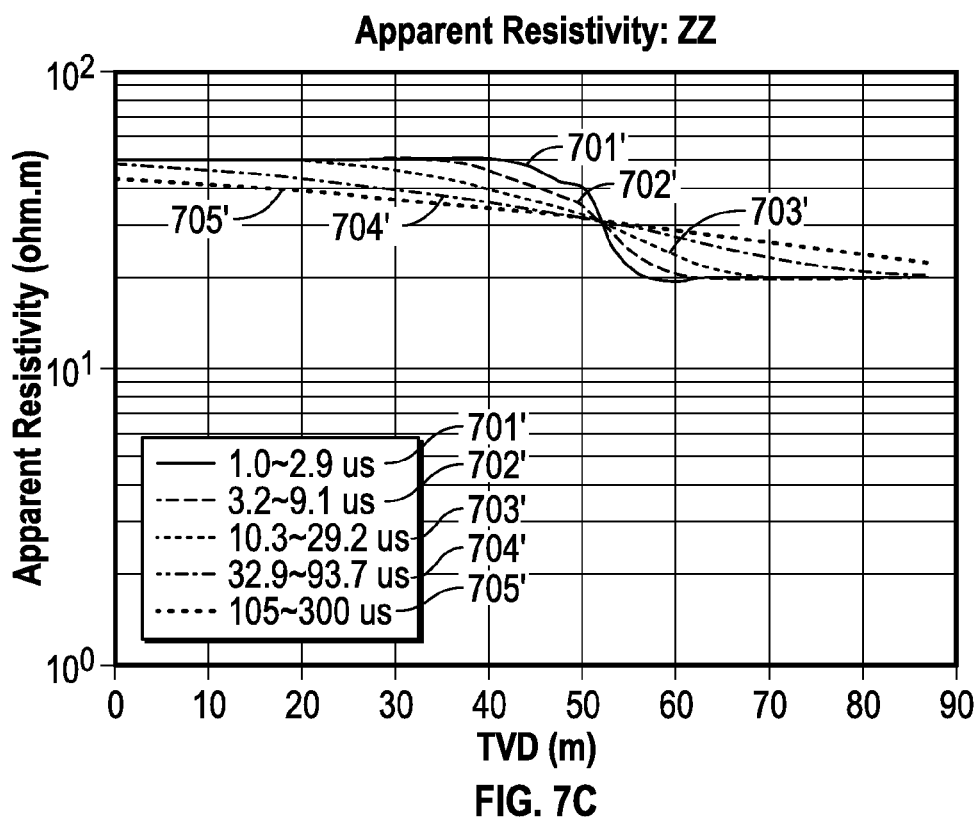
FIG. 7C illustrates an apparent resistivity log for the ZZ component in accordance with embodiments of the present disclosure.

FIG. 7A illustrates an example tool configuration with respect to an earth formation in accordance with embodiments of the present disclosure. FIG. 7B illustrates an apparent resistivity log for the XX component in accordance with embodiments of the present disclosure. FIG. 7C illustrates an apparent resistivity log for the ZZ component in accordance with embodiments of the present disclosure. Generation of the AR logs of FIGS. 7B-7C are consistent with the procedure described above, which takes the synthetic TEM responses and converts to several AR values at each logging depth, and are displayed in the new format.

In this particular case N=50, n=5, and the time range is [1, 300] μs, divided into 5 time windows as illustrated in the plots. The benchmark model is the same as in FIGS. 4A-4C. It is readily apparent that FIG. 7B is free of artifacts, indicating that the new method removes ambiguity in AR determination and is much more robust and reliable than the previous method.

The AR logs of FIGS. 7B and 7C are useful tools which provide valuable petrophysical information about the formation. At zero TVD all five AR values are almost collocated at 50 ohm-m indicating the tool "sees" (e.g. experiences or senses) a homogeneous 50 ohm-m formation. As logging proceeds, the curves 701-705 (and 701'-705', respectively) demonstrate decreasing AR with increasing time/DOI, which indicates a conductive boundary approaching. Curve 701 responds latest (but most abruptly) to the boundary as the tool crosses the boundary at TVD=50 m, which could be used as a boundary-crossing indicator. Eventually all curves again read the same at 20 ohm-m showing that the tool now sees itself in a homogeneous 20 ohm-m formation.

If the thickness, dip angle and the resistivity of each layer is predetermined (e.g. from pilot wells or other wells in the same field), the AR curves can be used as a boundary detector. Visually, it is easy to determine that AR curve 705 starts to see the boundary at least 30 meters away with the AR reading close to 40 ohm-m, while the other curves still read around 50 ohm-m. It should give a very early warning of approaching conductive layer for the drilling engineer to respond accordingly. A one-parameter inversion can be developed based on the AR curves for the exact value of the distance to bed.

Figure 8A:
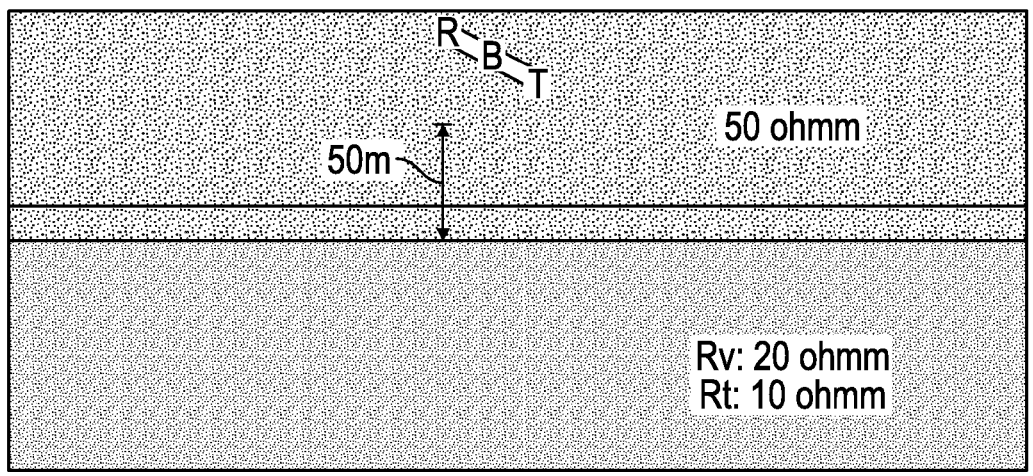
FIGS. 8A-8C show the example of a two-layer formation model in accordance with embodiments of the present disclosure.
Figure 8B:
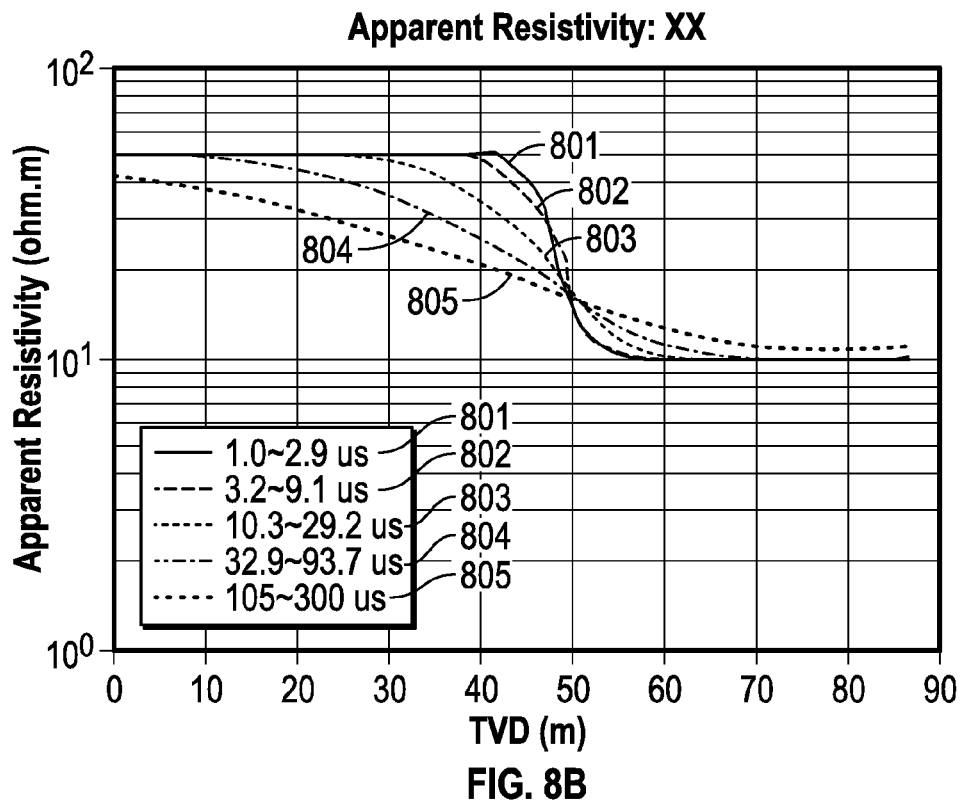
Figure 8C:
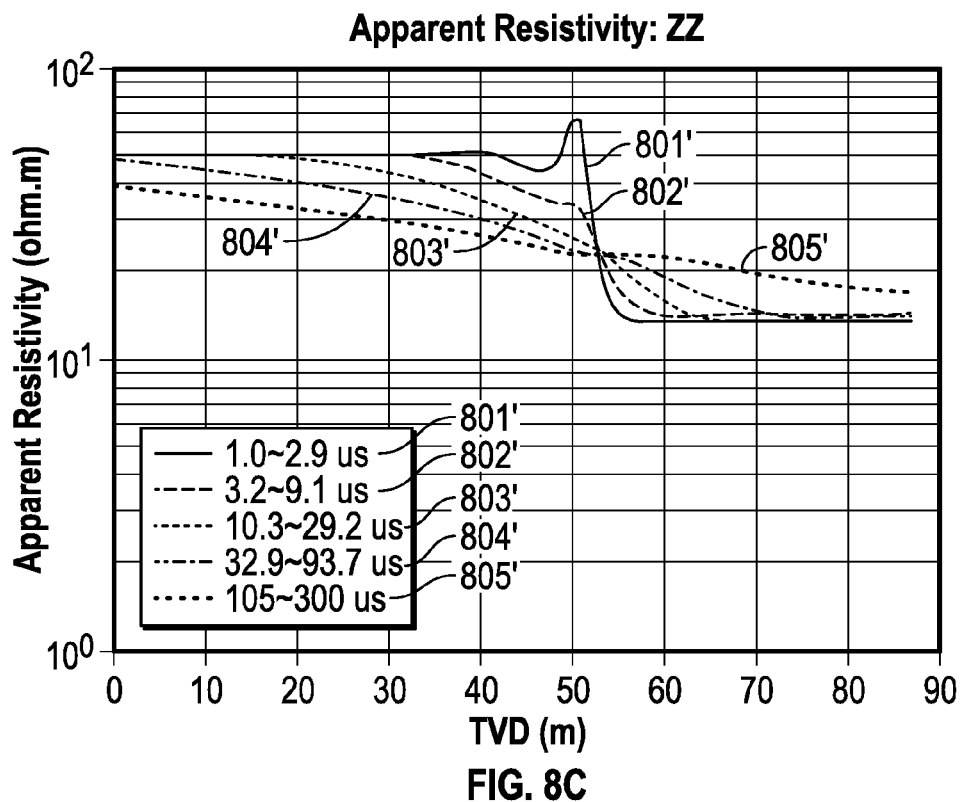

The XX and ZZ AR logs may also be used together as an anisotropy indicator. FIGS. 8A-8C show the example of a two-layer formation model. The top layer is isotropic with resistivity 50 ohm-m. The bottom layer is anisotropic, with vertical and horizontal resistivity 20 ohm-m and 10 ohm-m, respectively. When the tool logs through the first layer (TVD<50 m), the shallower curves for both XX and ZZ components read near 50 ohm-m, which indicates the top layer is isotropic. After the tool enters the second layer, the shallower AR curves for XX read around 10 ohm-m while for ZZ the value is close to 14 ohm-m. This indicates the second layer is anisotropic, with a vertical resistivity greater than horizontal resistivity based on the high relative angle of the tool to the bed. Thus, AR curves may be used for identification and qualitative analysis of the anisotropy effect. The exact value of anisotropy can be obtained through inversion.

Figure 9A:
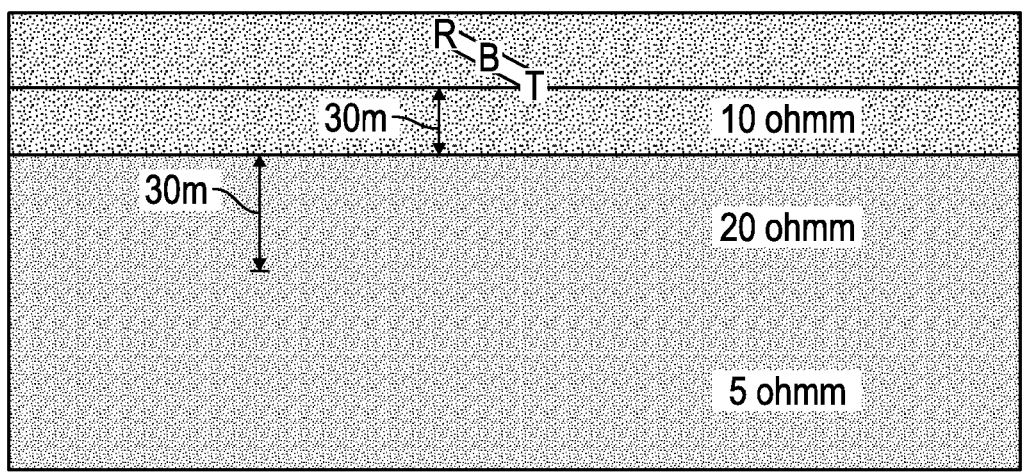
FIGS. 9A-9C show the example for a three-layer model in accordance with embodiments of the present disclosure.
Figure 9B:
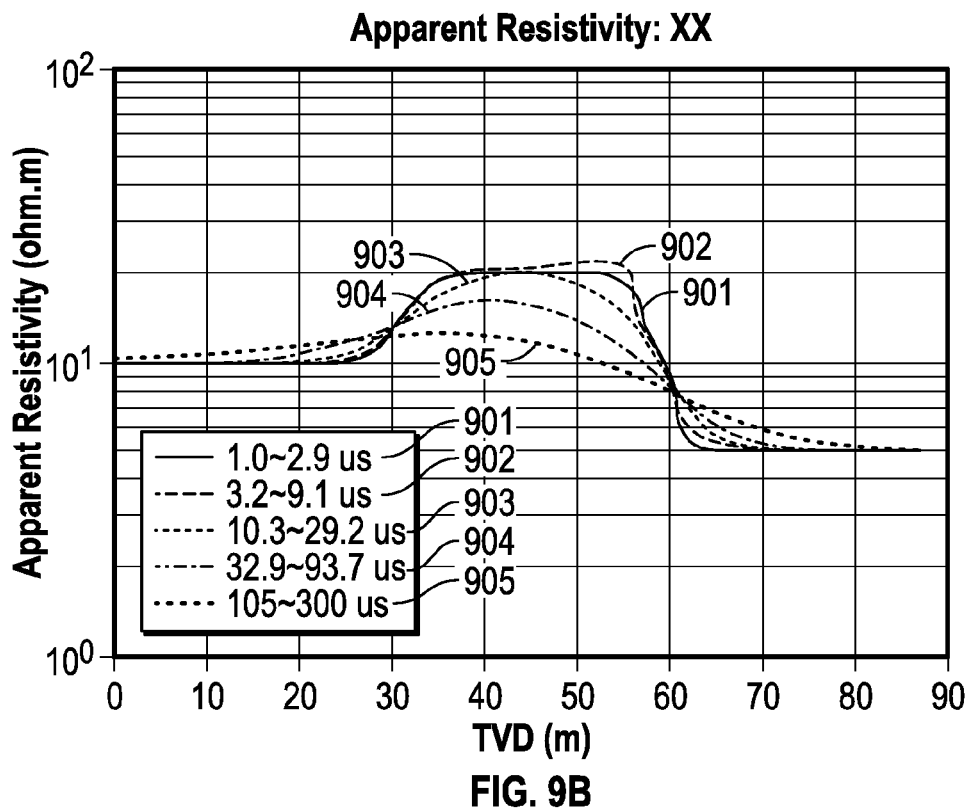
Figure 9C:
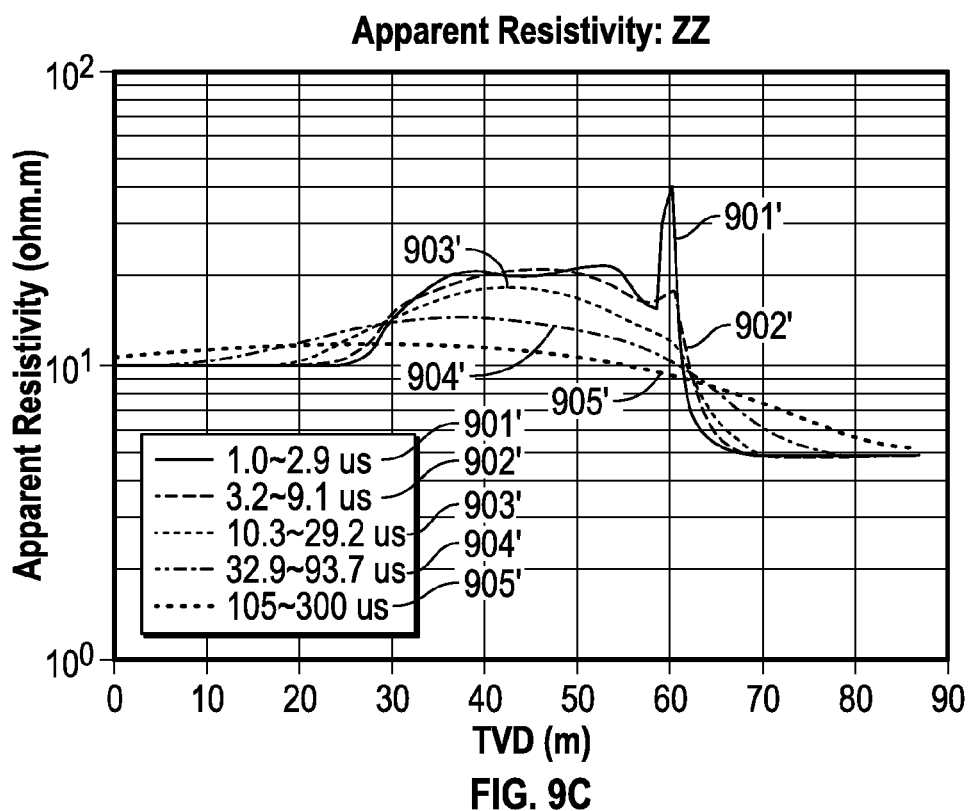

FIGS. 9A-9C show the example for a three-layer model, where the resistivity for each layer is 10 ohm-m, 20 ohm-m, and 5 ohm-m, respectively. The tool starts 30 meters above the first boundary and the thickness of the second layer is 30 meters. The dip angle maintains at 85 degrees as the tool logs across all three layers. The shallower AR curves are able to correctly indicate the resistivity values and the boundary positions for each layer. The deepest curve shows an averaged AR response indicating that the diameter of detection of the latest TEM signal is greater than the thickness of the second layer.

Embodiments of the disclosure include using the corresponding apparent resistivity values to estimate a corresponding distance from the device (e.g., tool 600) to the interface. This estimation may be carried out by estimating a diffusion time corresponding to the apparent resistivity values and calculating a diffusion distance corresponding to the diffusion time in a homogeneous formation. Here and after the term "diffusion" should be understood only in a sense that in a quasi-stationary approximation (which may be the present case) the EM fields are governed by a second order differential equation that has exactly the form of diffusion equation. For example, curve separation may be used to estimate the diffusion time.

An example is provided for illustration using the embodiment described above with reference to FIGS. 7A-7C. For each logging depth, five AR values AR[1 . . . 5] are estimated for each of the five samples corresponding to five discrete time windows of the TEM measurement (T[1 . . . 5]). In this example, $$T[1 \ldots 5] = [1.0, 3.2, 10.3, 32.9, 105]$$

wherein the values are in microseconds.

A processor is used to interpolate between T[1] and T[5] to increase the number of data points. In this case, the interpolation may generate forty AR values ($AR_{int}[1 \ldots 40]$) corresponding to forty time values ($T_{int}[1 \ldots 40]$). A minimum index i is determined such that $$100 \times \left| \frac{AR_{int}[i] - AR_{int}[1]}{AR_{int}[1]} \right| > \beta,$$

wherein β is a curve deviation threshold, in percent (e.g., 3-5 percent). The distance (d) to the interface may then be determined according to $$\alpha \times \sqrt{\frac{2 T_{int}[i] \times 10^{-6} \times AR_{int}[1]}{4\pi \times 10^{-7}}}$$

wherein α is a distance scaling factor, 0<α<1 (e.g., 0.8-0.9). A log of the corresponding distance to interface as a function of borehole depth may be generated and displayed.

Figure 10A:
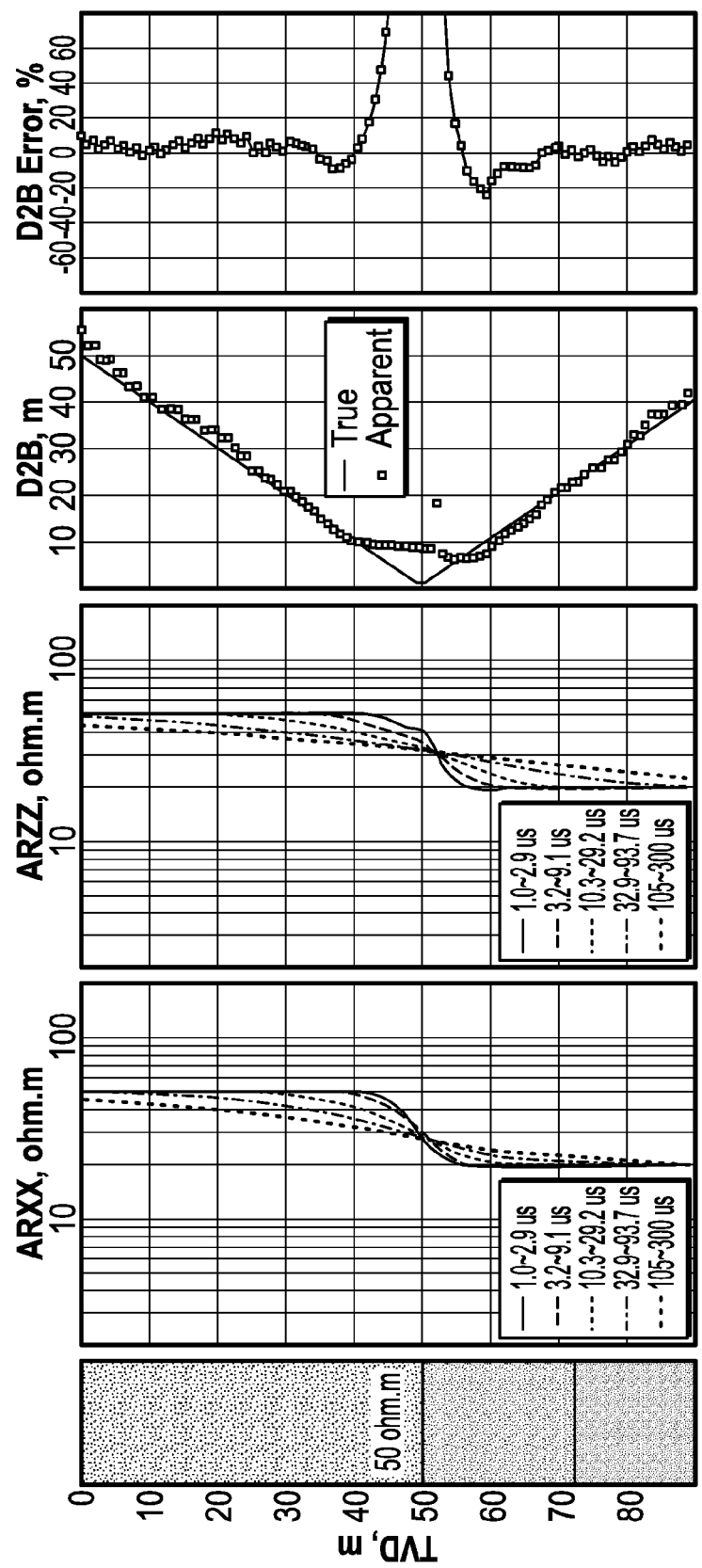
FIGS. 10A-10C illustrate an example display of the apparent resistivity log with an estimated distance-to-bed log and a distance-to-bed projected error log.
Figure 10B:
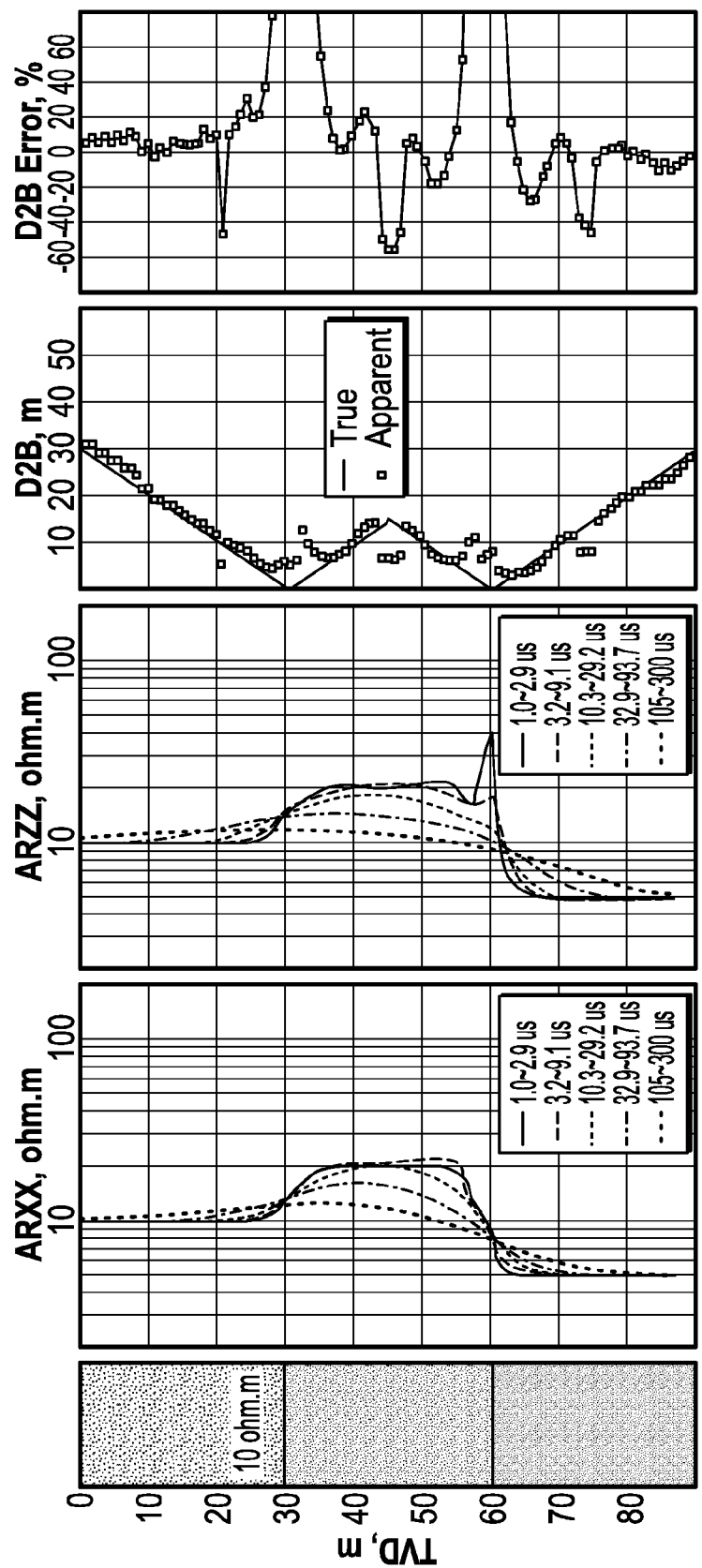
Figure 10C:
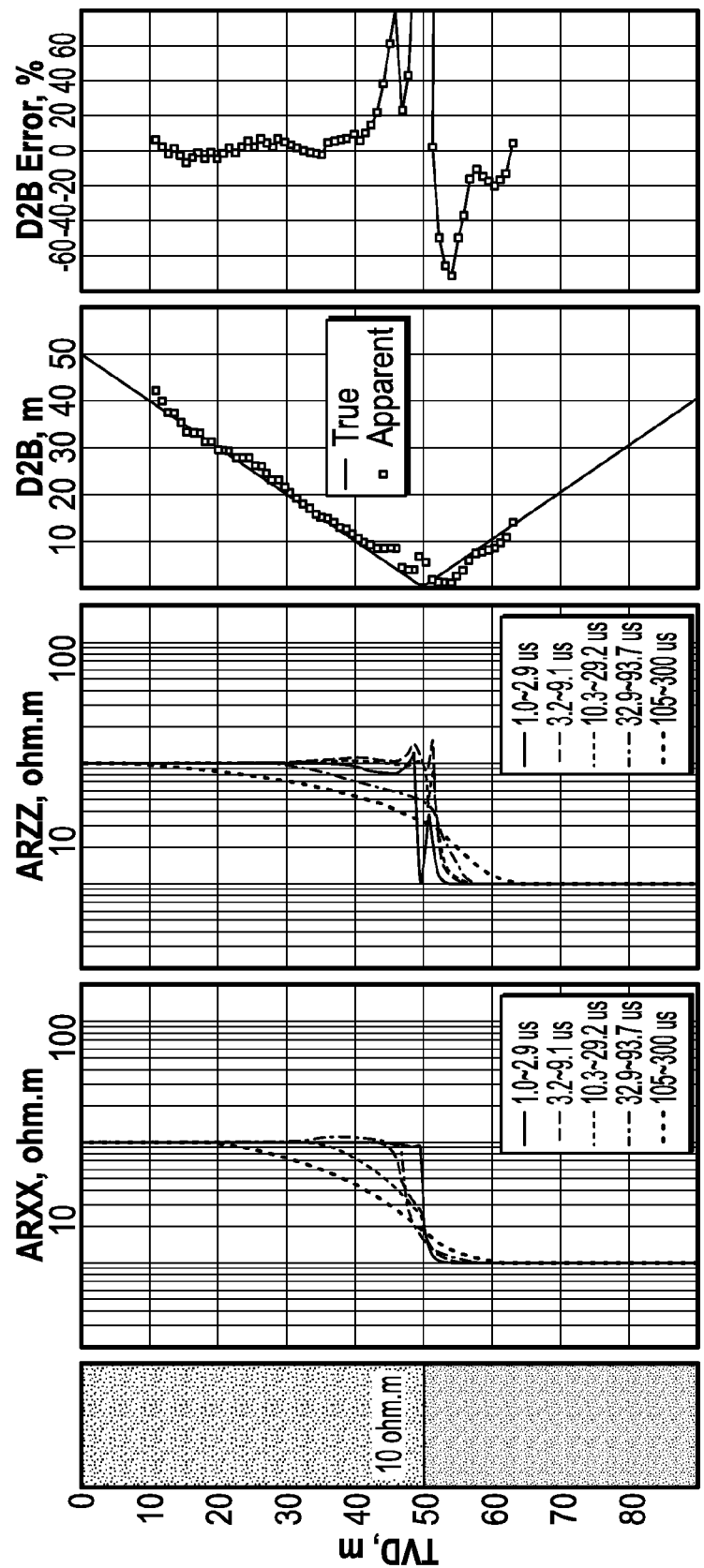

FIGS. 10A-10C illustrate an example display of the apparent resistivity log with an estimated distance-to-bed log and a distance-to-bed projected error log. FIG. 10A shows logs consistent with a two-layer model as described with respect to FIGS. 7A-7C. FIG. 10B shows logs consistent with a three-layer model as described with respect to FIGS. 9A-9C. FIG. 10C shows logs consistent with a high contrast (conductive) two-layer model.

One way of characterizing an earth formation is by using gravity measurements to estimate hydrocarbon or other fluid movement. Time-lapse reservoir monitoring may be one application for embodiments of the present disclosure. Hydrocarbons in earth formations, such as reservoirs, are subject to the migration of fluids (oil, water, gas, etc.) over time. Detecting, measuring, and mapping the movement of these fluids may be useful for estimating the producible hydrocarbon content of an earth formation and improving hydrocarbon recovery. The hydrocarbon movement may also be used to estimate the rate of depletion of a reservoir.

Embodiments of the present disclosure may be applied in monitoring fluid fronts. One situation where a fluid front may arise is in secondary and enhanced recovery operations where a fluid such as water is injected into the formation from an injection well spaced apart from the well. Methods may further include conducting secondary and enhanced recovery operations in dependence upon information relating to the fluid front.

The presence of conductive water in a formation that includes nonconductive hydrocarbons produces a resistivity contrast that can be located using TEM tool 600. The tool may be a wireline tool, which may be deployed in a well, called a monitor well. Using the tool 600 allows the location of the fluid front to be identified, which facilitates control of secondary recovery operations. In other embodiments the tool may be permanently deployed in a borehole. The permanent deployment may be in a production well.

Figure 11:
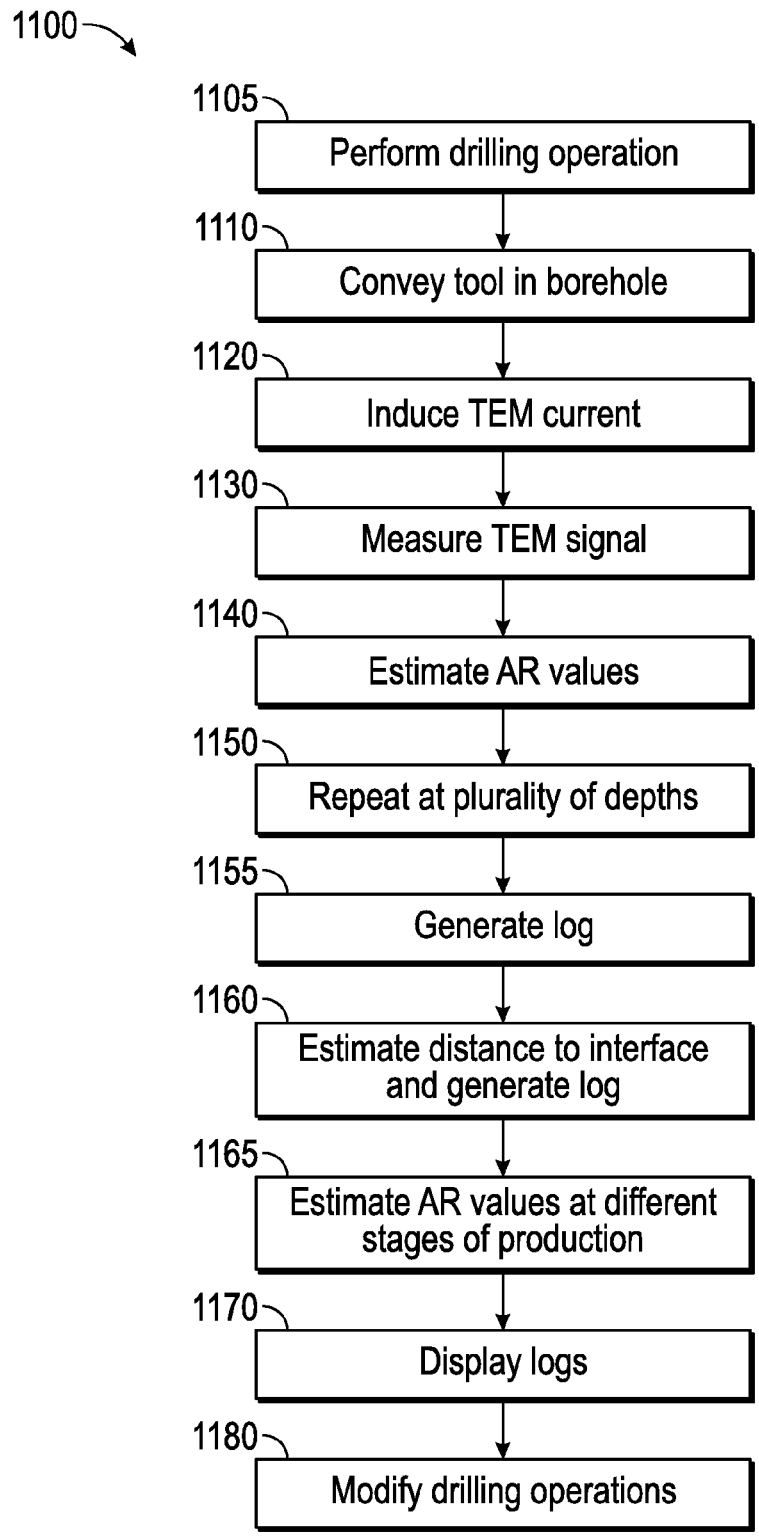
FIG. 11 illustrates a method for estimating a parameter of interest in accordance with embodiments of the present disclosure.

FIG. 11 illustrates a method for estimating a parameter of interest in accordance with embodiments of the present disclosure. Optional step 1105 of the method 1100 may include performing a drilling operation in a borehole. For example, a drill string may be used to form (e.g., drill) the borehole. Optional step 1110 may include conveying a TEM tool 600 in the borehole on a conveyance device.

Step 1120 of the method 1100 includes inducing a time-dependent current in the formation. This may be carried out by abruptly changing a magnetic moment of a transmitter in the borehole. Step 1130 of the method 1100 includes measuring a time-dependent transient electromagnetic (TEM) signal induced by the formation responsive to the current, which produces a TEM measurement. The signal may be generated in the receiver (or indicative of the signal generated in the receiver) and caused by the formation responsive to the current.

Step 1140 of the method 1100 includes estimating apparent resistivity values for each of a plurality of samples derived from the TEM measurement. Step 1140 may include generating the plurality of samples by dividing the TEM measurement into a plurality of corresponding intervals. Each sample may correspond to a discrete time window of the TEM measurement. Estimating the apparent resistivity values for each of the plurality of samples may include determining for each sample a simulated homogeneous formation that provides a best fit for the sample. Step 1140 may be carried out while conducting drilling operations in the borehole and may be carried out in near real-time.

Optionally, at step 1140, the method may be carried out by identifying, from a plurality of simulated homogeneous formations, the simulated homogeneous formation having synthetic responses that provide the best fit for the sample. Any suitable curve-fitting technique may be utilized, including, but not limited to, the techniques that utilize least square fit (linear or non-linear), exponential functions, and so on. The synthetic responses may be determined using the respective simulated homogeneous formation and known parameters for the tool. As one option, step 1140 may further be carried out by storing the synthetic responses for each of a plurality of simulated homogeneous formations. The synthetic responses may be pre-calculated using the respective simulated homogeneous formation and known parameters for the tool. For example, a processor may use a look-up table to map responses to identify the simulated homogeneous formation. As another option, step 1140 may include determining in near real-time synthetic responses for each of a plurality of simulated homogeneous formations using the respective simulated homogeneous formation and known parameters for the tool. This may be carried out algorithmically and/or iteratively. Known parameters of the tool may include at least one of: i) a transmitter moment; and ii) receiver moment; and iii) tool dimensions. Step 1140 may also include using a least squares minimization technique.

Optional step 1150 may include repeating steps 1120-1140 to estimate corresponding apparent resistivity values estimated from TEM measurements for a plurality of borehole depths. Optional step 1155 may include generating a log of the corresponding apparent resistivity values as a function of borehole depth. Optional step 1160 may include using the corresponding apparent resistivity values to estimate a corresponding distance to an interface for the plurality of borehole depths; and generating a log of the distance to the interface as a function of depth. Optional step 1165 may include repeating steps 1120-1140 to estimate corresponding apparent resistivity values estimated from TEM measurements at different stages in the production or injection cycle. Optional step 1165 may include may include generating a log of the corresponding apparent resistivity values as a function of the stage of the hydrocarbon recovery operation (e.g., number of days into the recovery operation) for monitoring reservoir fluids. Step 1165 may include using the corresponding apparent resistivity values to estimate a corresponding distance to fluid fronts for the plurality of hydrocarbon recovery stages and generating a log of the distance to fluid fronts as a function of the stage in the hydrocarbon recovery operation. Optional step 1170 may include displaying any of the apparent resistivity logs and the distance-to-interface logs above. The display facilitates visualization of formation resistivity variations. Optional step 1180 may include modifying drilling operations in the borehole dependent upon the estimated apparent resistivity values.

Mathematical models, look-up tables, neural networks, or other models representing relationships between the parameter(s) of interest and apparent resistivity values may be used to characterize the drilling operation, optimize one or more drilling parameters of a drilling operation, change direction of drilling, or otherwise modify drilling operations in the borehole. The system may carry out these actions through notifications, advice, and/or intelligent control.

The term "conveyance device" or "carrier" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, and self-propelled tractors.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, a processor includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

Thus, configuration of the processor may include operative connection with resident memory and peripherals for executing programmed instructions. In some embodiments, estimation of the parameter of interest may involve applying a model. The model may include, but is not limited to, (i) a mathematical equation, (ii) an algorithm, (iii) a database of associated parameters, or a combination thereof.

The term "near real-time" as applied to methods of the present disclosure refers to an action performed while the BHA is still downhole and prior to the drill bit extending the borehole a distance of 1 meter, 0.5 meters, 0.25 meters, 0.1 meters, or less; and may be defined as estimation of the parameter of interest within 15 minutes of measurement, within 10 minutes of measurement, within 5 minutes of measurement, within 3 minutes of measurement, within 2 minutes of measurement, within 1 minute of measurement, or less.

The term "predominantly" relates to an amount of current induced in a depth of investigation in the earth formation relative to an amount of current induced in another depth in the earth formation. A predominantly greater amount of current induced in the depth of interest will provide a response of electromagnetic energy that can be related to a property of the earth formation at the depth of investigation. As used herein, the term "predominantly" relates at least to a minimum amount of increase in currents induced at the depth of investigation with respect to other depths, the minimum amount being necessary to be able to estimate a property of the earth formation at the depth of investigation from the response.

While the present disclosure is discussed in the context of a hydrocarbon producing well, it should be understood that the present disclosure may be used in any borehole environment (e.g., a water or geothermal well).

The present disclosure is susceptible to embodiments of different forms. There are shown in the drawings, and herein are described in detail, specific embodiments of the present disclosure with the understanding that the present disclosure is to be considered an exemplification of the principles of the disclosure and is not intended to limit the disclosure to that illustrated and described herein. While the foregoing disclosure is directed to the one mode embodiments of the disclosure, various modifications will be apparent to those skilled in the art. It is intended that all variations be embraced by the foregoing disclosure.

We claim:

1. A method for evaluating an earth formation intersected by a borehole, the method comprising:
    (a) inducing a current in the formation;
    (b) measuring a time-dependent transient electromagnetic (TEM) signal induced by the formation responsive to the current;
    (c) estimating apparent resistivity values for each of a plurality of samples derived from the TEM measurement by dividing the TEM measurement into windows comprising a plurality of corresponding time intervals, wherein each sample corresponds to a discrete time window of the TEM measurement.

2. The method of claim 1, wherein estimating the apparent resistivity values for each of the plurality of samples comprises determining for each sample a simulated homogeneous formation having a corresponding resistivity value that provides a best fit for the sample.

3. The method of claim 2, wherein a tool is used to perform at least steps (a) and (b), and determining for each sample the simulated homogeneous formation that provides the best fit for the sample further comprises:
identifying, from a plurality of simulated homogeneous formations, the simulated homogeneous formation having synthetic responses that provide the best fit for the sample, wherein the synthetic responses are determined using the corresponding resistivity value of the respective simulated homogeneous formation and known parameters for the tool.

4. The method of claim 3, further comprising:
storing the synthetic responses for each of a plurality of simulated homogeneous formations, the synthetic responses being pre-calculated using the respective simulated homogeneous formation and known parameters for the tool.

5. The method of claim 3, further comprising:
determining in near real-time synthetic responses for each of a plurality of simulated homogeneous formations using the respective simulated homogeneous formation and known parameters for the tool.

6. The method of claim 3 wherein the known parameters for the tool comprise at least one of: i) a transmitter moment; ii) a receiver moment; and iii) tool dimensions.

7. The method of claim 3 further comprising using a least squares minimization technique.

8. The method of claim 1 further comprising repeating steps (a)-(c) to estimate corresponding apparent resistivity values for a plurality of borehole depths estimated from TEM measurements for the plurality of borehole depths.

9. The method of claim 8 further comprising generating a log of the corresponding apparent resistivity values as a function of borehole depth.

10. The method of claim 9 further comprising displaying the apparent resistivity log.

11. The method of claim 8 further comprising:
using the corresponding apparent resistivity values to estimate a corresponding distance to an interface for the plurality of borehole depths; and
generating a log of the distance to the interface as a function of depth.

12. The method of claim 11, wherein using the corresponding apparent resistivity values to estimate the corresponding distance to the interface comprises:
identifying from the apparent resistivity values a simulated homogeneous formation that provides a best fit for the sample;
estimating a diffusion time corresponding to apparent resistivity curve separation; and
calculating a diffusion distance corresponding to the diffusion time in the simulated homogeneous formation.

13. The method of claim 1, wherein inducing a current in the formation further comprises changing a magnetic moment of a transmitter in the borehole.

14. The method of claim 1, comprising estimating apparent resistivity values for each of the plurality of samples derived from the TEM measurement while conducting drilling operations in the borehole.

15. The method of claim 1 comprising repeating steps (a)-(c) to estimate corresponding apparent resistivity values for a plurality of different stages in a hydrocarbon recovery operation estimated from TEM measurements at the plurality of different stages in a hydrocarbon recovery operation.

16. The method of claim 15 further comprising generating a log of the corresponding apparent resistivity values as a function of stage of the hydrocarbon recovery operation.

17. The method of claim 16 further comprising displaying the apparent resistivity log.

18. The method of claim 15 further comprising using the corresponding apparent resistivity values to estimate a corresponding distance to fluid fronts for the plurality of different stages and generating a log of the distance to fluid fronts as a function of stage of the hydrocarbon recovery operation.

19. A non-transitory computer readable medium product for evaluating an earth formation intersected by a borehole, the computer readable medium product having instructions disposed thereon that, when executed by at least one processor, cause the at least one processor to:
estimate apparent resistivity values for each of a plurality of samples derived from a measurement of a time-dependent transient electromagnetic (TEM) signal in a borehole by dividing the TEM measurement into windows comprising a plurality of corresponding time intervals, the signal induced by the formation responsive to a TEM current in the formation, wherein each sample corresponds to a discrete time window of the TEM measurement.

20. An apparatus for evaluating an earth formation intersected by a borehole, the apparatus comprising:
a carrier configured to be conveyed in a borehole;
a transmitter disposed on the carrier and configured to induce a current in the formation;
at least one receiver disposed on the carrier and configured to provide a time-dependent transient electromagnetic (TEM) signal induced by the formation responsive to the current;
at least one processor; and a non-transitory computer readable medium accessible to the processor with instructions thereon that, when executed by the at least one processor, cause the at least one processor to:
measure the signal; and
estimate apparent resistivity values for each of a plurality of samples derived from the measurement by dividing the TEM measurement into windows comprising a plurality of corresponding time intervals, wherein each sample corresponds to a discrete time window of the measurement.

* * * * *